United States Patent
Foerstner et al.

(10) Patent No.: US 7,287,198 B2
(45) Date of Patent: Oct. 23, 2007

(54) METHOD FOR MONITORING A MICROPROCESSOR AND CIRCUIT ARRANGEMENT HAVING A MICROPROCESSOR

(75) Inventors: Dirk Foerstner, Stuttgart (DE); Johannes Schier, Beilstein (DE)

(73) Assignee: Robert Bosch GmbH, Stuttgart (DE)

( * ) Notice: Subject to any disclaimer, the term of this patent is extended or adjusted under 35 U.S.C. 154(b) by 841 days.

(21) Appl. No.: 10/634,157

(22) Filed: Aug. 4, 2003

(65) Prior Publication Data

US 2004/0093508 A1 May 13, 2004

(30) Foreign Application Priority Data

Aug. 3, 2002 (DE) ................. 102 35 564

(51) Int. Cl.
*G06F 11/00* (2006.01)
(52) U.S. Cl. ........................................ 714/55
(58) Field of Classification Search .................. 714/55
See application file for complete search history.

(56) References Cited

U.S. PATENT DOCUMENTS

| 4,598,355 | A | * | 7/1986 | Shepler et al. ................. 700/79 |
| 4,809,280 | A | * | 2/1989 | Shonaka ....................... 714/55 |
| 4,956,842 | A | * | 9/1990 | Said ............................ 714/815 |
| 5,184,025 | A | * | 2/1993 | McCurry et al. .............. 307/66 |
| 5,522,040 | A | * | 5/1996 | Hofsass et al. ................ 714/55 |
| 5,768,496 | A | * | 6/1998 | Lidgett et al. ................. 714/25 |
| 5,879,374 | A | * | 3/1999 | Powers et al. ................. 607/5 |
| 6,260,162 | B1 | * | 7/2001 | Typaldos et al. ............. 714/55 |
| 6,618,825 | B1 | * | 9/2003 | Shaw ........................... 714/55 |
| 6,883,123 | B2 | * | 4/2005 | Hashimoto et al. ........... 714/55 |
| 6,957,353 | B2 | * | 10/2005 | Bresniker et al. ........... 713/320 |
| 7,137,036 | B2 | * | 11/2006 | Urahama ...................... 714/36 |
| 2002/0116670 | A1 | * | 8/2002 | Oshima et al. ................ 714/55 |

FOREIGN PATENT DOCUMENTS

DE 43 30 940 3/1995
WO WO 97/32282 9/1997

OTHER PUBLICATIONS

Newton's Telecom Dictionary, 18th edition, Feb. 2002, p. 258.*

* cited by examiner

*Primary Examiner*—Gabriel Chu
*Assistant Examiner*—Joshua Lohn
(74) *Attorney, Agent, or Firm*—Kenyon & Kenyon LLP

(57) ABSTRACT

A method for monitoring a microprocessor and a circuit arrangement having a microprocessor are described. A microprocessor is monitored using an assigned watchdog. The watchdog monitors whether reset pulses are received within a time interval of predetermined duration. If the reset pulse is received, the time interval is reset and restarted. If reset pulses are not received, a reset of the microprocessor is initiated. In suitable operating phases of the microprocessor, a check function of the watchdog is activated. During the execution of the check function, first a reset of the watchdog is executed and then a sequence of waiting loops, whose duration is greater than the duration of the time interval of the watchdog, is executed.

12 Claims, 2 Drawing Sheets

METHOD FOR MONITORING A MICROPROCESSOR AND CIRCUIT ARRANGEMENT HAVING A MICROPROCESSOR

FIELD OF THE INVENTION

The present invention relates to a method for monitoring a microprocessor and a circuit arrangement having a microprocessor.

BACKGROUND INFORMATION

Using a watchdog to monitor the function of a microprocessor, which is also understood to include microcontrollers according to the present application, is known. Watchdogs are circuits assigned to the microprocessor which check whether a reset pulse has been generated by the microprocessor within a time interval of predetermined duration. The periodic generation of a reset pulse indicates the proper function of the microprocessor. If no reset pulse is received, a reset of the microprocessor is performed, through which the microprocessor is to be returned to a proper state.

Checking the function of a watchdog by using a second watchdog is known from German Published Patent Application No. 43 30 940, for example. For this purpose, the watchdogs are alternately disrupted by the microprocessor and the microprocessor checks whether the other watchdog triggers an alarm and/or generates a reset.

A disadvantage of the watchdog described above is that it is not capable of monitoring the microprocessor for a clock frequency which is too high. In order to avoid at least this problem, a modified watchdog in which the time interval monitored has not only an upper limit but also a lower limit, so that the reset pulse must be received between the upper and the lower limit of the time interval during proper operation, is known from PCT Publication No. WO 97/32282. If the clock frequency of the microprocessor is too high, the reset pulse is received before the lower interval limit and an alarm signal is generated.

A disadvantage of the known related art is that both measures result in increased construction cost and a more complicated structure of the watchdog. The arrangement of two watchdogs and their mutual monitoring is a significantly increased construction cost. In addition, the construction cost for a modified watchdog which is capable of monitoring both an upper limit and a lower limit is significantly increased in comparison to a watchdog which monitors only an upper interval limit.

SUMMARY OF THE INVENTION

In contrast, it is an object of the present invention to allow monitoring of both the function of the watchdog and the clock frequency of the microprocessor using an unmodified watchdog.

In the method according to the present invention and the circuit arrangement according to the present invention, a microprocessor is monitored using an assigned watchdog. The watchdog monitors whether reset pulses are received within a time interval of predetermined duration. When the reset pulse is received, the time interval is reset and restarted. If reset pulses are not received, a reset of the microprocessor is initiated. According to the present invention, a check function of the watchdog is activated in suitable operating phases of the microprocessor. During the execution of the check function, a reset of the watchdog is executed first, followed by a sequence of waiting loops, whose duration is greater than the duration of the time interval of the watchdog.

A defined starting state of the watchdog is generated through the reset of the watchdog initially performed using a reset pulse. Through the subsequent execution of the sequence of waiting loops, the processing of the sequence taking longer than the time interval, a reset is generated by the watchdog if the watchdog is functioning and the clock frequency of the microprocessor is not too high. If the reset occurs, further steps are no longer executed, and the microprocessor is restarted. The processes executed until the suitable operating state is reached may then be continued further. If, however, the clock frequency is so high that, due to the increased clock frequency, the waiting loops have ended before the time interval expires, there is a defect. This is also true for the case in which the microprocessor does not generate a reset due to a defect of the watchdog. According to an advantageous embodiment of the present invention, an error message is generated in this case, so that a suitable intervention may be performed.

In order that a check function is not executed continuously during proper operation of the microprocessor, the execution is linked to the existence of specific suitable operating states.

The normal function of the watchdog may be executed independently of the execution of the check function. In particular, this means that the microprocessor is monitored by the watchdog during its normal operation for the regular generation of the reset pulse within the time interval and a reset of the microprocessor is executed if no reset pulse is received.

According to a further embodiment of the present invention, a counter content is first checked at the beginning of the check function, the counter is incremented, and the check function is only performed as a function of the counter content. Thus, a counter having a word length of one bit may be provided, and the check function may be executed at only one of the two counter contents. The counter content may be stored on a non-volatile memory in particular, such as an EEPROM, so that the counter content is not lost when the processor is reset. This measure is especially necessary when the start of operation of the microprocessor is a suitable operating state. In this case, a check may not be started again during the execution of the sequence of waiting loops after a proper reset of the microprocessor, since otherwise an endless loop may arise. After one or a specific number of executions of a check function, the microprocessor returns to its normal operation.

According to embodiments of the present invention, it is possible to differentiate between multiple, in particular four, counter contents. During each of the first counter contents, in particular three counter contents, a check function is executed, but during the last counter content, a check function is no longer executed. In this case, the counter content may also simultaneously be a parameter which is taken into consideration in the execution of the check function. Thus, the duration of the sequence of waiting loops, i.e., in particular the number of executions of the waiting loops, may be a function of the counter content. If the duration of the sequence of waiting loops is selected to be shorter and shorter and is shorter than the duration of the time interval for the last execution of the check function, it is also possible to differentiate between the error sources of malfunction of the watchdog and too high a frequency of the microprocessor.

One embodiment of the present invention is provided by a memory component, such as a ROM, which contains a computer program, executable on a microprocessor, which is capable of executing a method according to the present invention.

A circuit arrangement according to the present invention provides a watchdog, assigned to the microprocessor, for performing a reset of the microprocessor if a reset pulse has not been generated by the microprocessor and received by the watchdog within a time interval of predetermined duration. According to the present invention, the watchdog is supplied with a different clock pulse than the microprocessor. In addition, a non-volatile memory, such as an EEPROM, in which a counter content of a counter may be stored, is assigned to the microprocessor.

Because the watchdog has a separate clock pulse, independent of the microprocessor, it is made capable of monitoring the clock pulse duration during the execution of a check function. Since the clock signal of the watchdog is independent of the clock signal of the microprocessor, too high a clock frequency may be monitored during the monitoring of the microprocessor. Due to the too high clock frequency of the microprocessor, the duration of the sequence of waiting loops ends before the correctly measured time interval ends.

The present invention may be used in all microprocessors which are monitored using an external watchdog. In particular, the present invention may be used in connection with sensors and control units of a motor vehicle. The rotational speed and acceleration sensors of a control unit which influences the vehicle dynamics are cited as examples here. However, the present invention is in no way solely restricted to such applications.

DETAILED DESCRIPTION

Figure 1:
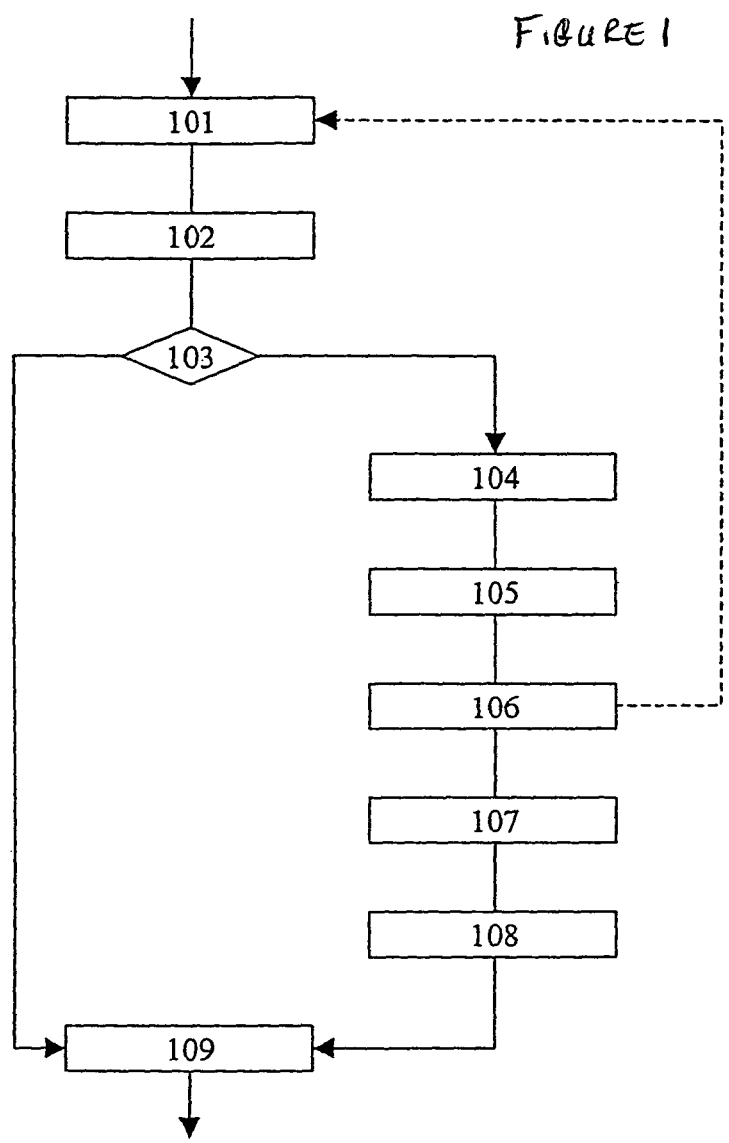
FIG. 1 shows the flow chart of a first method according to the present invention having a check function.
Figure 2:
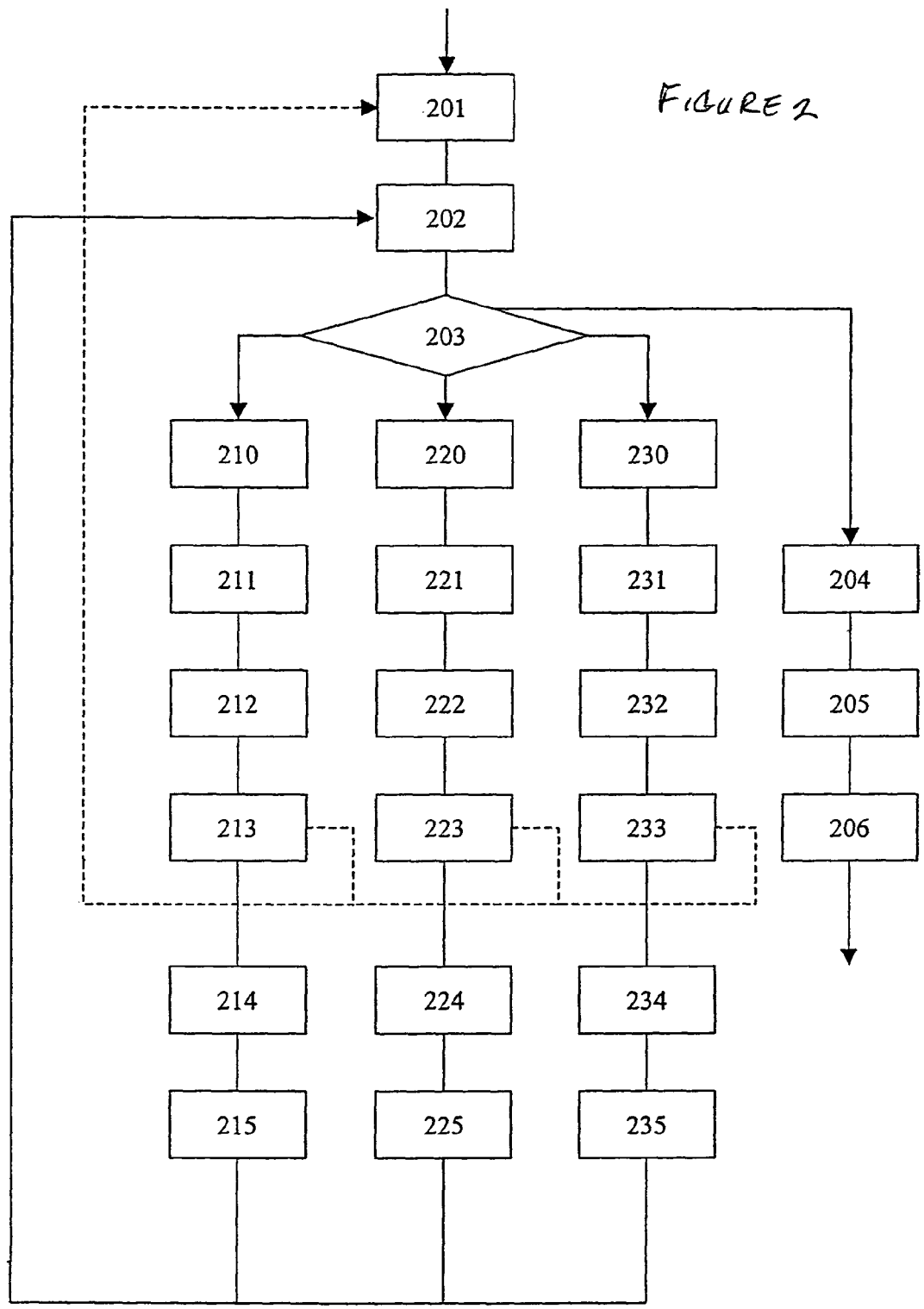
FIG. 2 shows the flow chart of a second method according to the present invention having multiple differing check functions.

FIGS. 1 and 2 show the flow charts of methods according to the present invention, which are each described by the sequence of associated check functions. In this case, the method shown in FIG. 1 has a binary counter, while in the method shown in FIG. 2, the counter has a length of 2 bits, i.e., differentiates between a total of 4 counter contents. The method shown in FIG. 1 is capable of recognizing a malfunction of the watchdog and too high a clock frequency of the microprocessor, but is not capable of differentiating between these two errors. In contrast, it is possible using the method shown in FIG. 2 to differentiate between the individual error causes.

The flow chart of a monitoring function of a method according to the present invention of monitoring a microprocessor is illustrated in FIG. 1. The sequence of the check function shown in FIG. 1 is executed when a suitable operating state of the microprocessor exists. This is the case when the microprocessor is started in particular. Other suitable states may also be defined. Suitable states are at least the operating states in which the microprocessor may be reset without disrupting the operating processes of the microprocessor. In particular, these are the times at which the microprocessor otherwise has a low workload.

First, a reset of the microprocessor, which may also be a microcontroller, is performed in step 101. The reset is performed in the first step of the method because the microprocessor is in startup, i.e., is being initialized. If a different operating phase than the startup of the processor is also recognized as a suitable operating phase, step 101 may be left out at the beginning of the check function and step 102 may be performed immediately. The sequence then passes over to step 102. In step 102, the counter content of the counter is read out of the non-volatile memory.

Subsequently, it is checked in step 103 whether the counter content has the value "0". If not, the sequence jumps to step 109, and the counter content is set to the value "0" and then stored in the non-volatile memory.

If it is determined in step 103 that the counter content has the value "0", step 104 is executed. In step 104, the counter content is first incremented. It then has the value "1" and is stored in the non-volatile memory. Subsequently, a reset pulse is generated for the watchdog in step 105. The watchdog is thus reset, i.e., the time interval within which the next reset pulse is received is restarted at zero. A sequence of waiting loops is then started in step 106. The sequence of waiting loops contains a sufficient number of waiting loops in this case so that the execution of the sequence of waiting loops lasts longer than the time interval of the watchdog at a normal clock rate. The number of waiting loops may preferably be selected in this case so that the duration of the execution is below the time interval if the clock rate is only slightly above the upper tolerance limit.

If the watchdog is functioning properly and the clock rate of the microprocessor is within the tolerance range, it determines that the time interval is exceeded during the execution of step 106, and a reset of the microprocessor is initiated, so that the watchdog forces the microprocessor to jump to step 101, as indicated by the dashed line. Steps 107 to 109 are not executed. After the counter was set to "1" in step 104, it will be determined upon the next query in step 103 that the counter content differs from "0" and the sequence thus jumps directly to step 109, and the check function is not actually executed per se.

If the time interval being exceeded was not registered during step 106, the sequence continues to step 107. In step 107, a reset pulse is first output so that any reset performed too late by the watchdog is prevented before execution of the next step. This would be the case if the watchdog functioned properly, but the microprocessor was being operated using a clock rate above the tolerance. Subsequently, an error message is generated in step 108, which may be processed appropriately. The sequence then jumps to step 109.

The counter content of the counter is set back to "0" and/or incremented in step 109. For a binary counter of length 1 bit, incrementing by "1" corresponds to a reset of the counter, since the counter content was previously "1", no matter how step 109 was reached. If the counter has a larger word length, the counter content may be increased through normal incrementation. If the counter has a word length of 4 bits, for example, the counter content "0" is reached through overrun of the word length only every sixteenth time. The check function is then not executed upon each suitable state, but accordingly less often.

FIG. 2 shows a method in which three check functions are executed, which differ in the number of waiting loops executed in the sequence of waiting loops. In this case, it is determined via the counter content which check function is executed. Otherwise, method steps 210 to 215, 220 to 225, and 230 to 235 of the three different check functions correspond to one another and also essentially correspond to steps 104 to 108 of the check method shown in FIG. 1.

The counter used here may have a word length of two bits, for example, i.e., it differentiates between the counter contents 0, 1, 2, and 3.

In accordance with the description of FIG. 1, the microprocessor is first reset in step 201, but this may also possibly not occur. Subsequently, the counter content is read out of the non-volatile memory in step 102. A jump branching occurs in step 103 as a function of the counter content. If the counter content is "0", "1", or "2", the sequence jumps to step 210, 220 or 230, respectively, which are each the beginning of a check function. At counter content "3", the sequence jumps to step 204, which initiates the analysis of the results of the check function.

If the sequence jumps to step 210 from step 203 because the counter content is "0", the counter content is first incremented to "1" in step 210. It then has the value "1". This value is stored in the non-volatile memory. Therefore, the sequence jumps from step 203 to step 220 upon the next call of a check function.

Subsequently, the value of a first parameter A is set to "0" and also stored in a non-volatile memory in step 211. A reset pulse of the watchdog is then generated in step 212. A sequence of waiting loops is then executed in step 213. The number of waiting loops is selected in this case in such a way that the sequence of waiting loops only ends before the time interval expires if the clock rate has a value far enough above the setpoint clock rate that the microprocessor may no longer be properly functioning. This may, for example, be a clock rate in the range of twice or five times the setpoint clock rate and is a function of the corresponding microprocessor and its use. Clock rates of this type do not occur in the operation of a microprocessor, and a reset would not be executed before reaching the end of the sequence of waiting loops only in case of a defective watchdog.

If the watchdog is functioning, a reset of the microprocessor is forced by the watchdog in that the sequence jumps to step 201. This jump is shown in the drawing using the dashed line.

Otherwise, a reset pulse is first generated for the watchdog in step 214, so that an undesired, delayed reset of the microprocessor is avoided. Subsequently, the value of parameter A is changed in step 215; it now assumes the value "1" and is stored in the non-volatile memory. The sequence then jumps to step 202.

Since the value of the counter is now "1", the sequence subsequently jumps from step 203 to step 220. In step 220, the counter is first incremented to "2" and the value is stored in the non-volatile memory. In step 221, parameter B is set to "0" and stored in the non-volatile memory. A reset pulse for the watchdog is then generated in step 222.

A sequence of waiting loops is then executed in step 223. In this case, the number of waiting loops is selected in such a way that the duration of the execution of the sequence of waiting loops is less than the time interval if the clock rate of the microprocessor is only slightly above the upper limit of the tolerance range, for example, 10% above the setpoint value of the clock rate. If the clock rate of the microprocessor is less than the upper limit of the tolerance range, a reset is performed by the watchdog, assuming proper function, before the end of the execution of the sequence of waiting loops, so that the sequence jumps back to step 201.

Otherwise, a reset pulse is generated in step 224 and parameter B is then set to "1" in step 225 and this value is stored. The sequence then jumps to step 202.

In step 202, the counter content, now "2", is read out and then the sequence jumps to step 230 in step 203. In step 230, the counter is first incremented to "3" and the value is stored in the non-volatile memory. Parameter C is then set to "0" in step 231 and stored in the non-volatile memory. A reset pulse for the watchdog is then generated in step 232.

A sequence of waiting loops is then executed in step 233. In this case, the number of waiting loops is selected in such a way that the duration of the execution of the sequence of waiting loops exceeds the time interval if the clock rate of the microprocessor is only slightly below the lower limit of the tolerance range, for example, 10% below the setpoint value of the clock rate. If the clock rate of the microprocessor is lower than the lower limit of the tolerance range, a reset is performed by the watchdog, assuming proper function, before the end of the execution of the sequence of waiting loops, so that the sequence jumps back to step 201.

Otherwise, a reset pulse is generated in step 234 and subsequently parameter C is set to "1" in step 235 and this value is stored. Subsequently, the sequence jumps to step 202.

The next time step 203 is reached, the counter content read out in step 202 is at "3". No further check function is executed, but rather an analysis is performed. For this purpose, the sequence jumps from step 203 to step 204. In step 204, the values of parameters A, B, C are read out, i.e., a 3 bit long data word. Proper functioning or a malfunction and its type is then concluded in step 205 as a function of the value of the data word in accordance with the table. A corresponding error message is generated. Subsequently, the counter content is reset to "0" again in step 206 and the method of monitoring is ended. Depending on the status message generated, corresponding measures may be performed and/or the microprocessor may execute other processes or, if these processes have been interrupted to execute the check, continue them.

| Parameter value | | | Status report | |
| --- | --- | --- | --- | --- |
| A | B | C | Watchdog | Clock rate of microprocessor |
| 0 | 0 | 1 | Correct | Correct |
| 0 | 0 | 0 | Correct | Too slow |
| 0 | 1 | 1 | Correct | Too fast |
| 1 | 1 | 1 | Defective | |

According to the method shown in FIG. 2, using one watchdog, which only detects the exceeding of an upper limiting value of a time interval, not only a clock rate which is too slow but also too high a clock rate of the microprocessor may thus be detected. The type of error existing may also be determined. The function of the watchdog may also be checked using the method and also differentiated from other errors.

Figure 3:
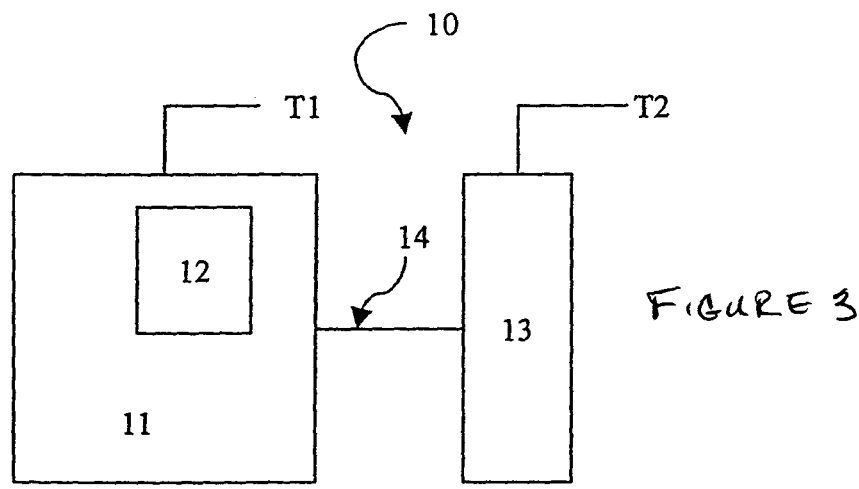
FIG. 3 shows the schematic illustration of a circuit arrangement according to the present invention.

FIG. 3 shows a schematic illustration of a circuit arrangement 10 according to the present intention. The circuit arrangement is formed by a microprocessor 11, a non-volatile memory 12, which forms part of the microprocessor, and watchdog 13. Memory 12 is used for storing the counter content and possibly storing parameters. Watchdog 13 is assigned to the microprocessor. Watchdog 13 is implemented as a simple watchdog which merely monitors the exceeding of a predetermined time interval between two reset pulses. Clock signal T1 is supplied to the microprocessor, while a separate clock signal T2 is supplied to watchdog 13. Watchdog 13 and microprocessor 11 are connected to one another via data line 14. A reset pulse generated by microprocessor 11 is transmitted to the watchdog via data line 14. The command from watchdog 13 to microprocessor 11 which causes the reset is also transmitted via data line 14. For this purpose, data line 14 may also have 2 individual lines.

What is claimed is:

1. A method for monitoring a microprocessor using an assigned watchdog, comprising:
    causing the watchdog to monitor a reception of a reset pulse within a time interval of a predetermined duration;
    causing the watchdog to initiate a reset of the microprocessor if the reset pulse is not received; and
    executing at least one check function of the watchdog in an operating phase of the microprocessor, each one of the at least one check function including a reset of the watchdog and an execution of a sequence of waiting loops, wherein a duration of the execution of the sequence of waiting loops of at least one of the at least one check function is greater than the predetermined duration of the time interval;
    incrementing a counter with the execution of the at least one check function, the execution of the at least one check function being a function of a content of the counter;
    wherein:
        the counter has four counter contents,
        an analysis is performed at one of the four counter contents, and
        the least one check function is executed each time at the other counter contents.

2. The method as recited in claim 1, further comprising:
    generating an error message if the watchdog has not reset the microprocessor by an end of the sequence of waiting loops.

3. The method as recited in claim 1, further comprising:
    performing the at least one check function at the content of the counter; and
    skipping the at least one check function at another content of the counter, the counter alternating between the content of the counter and the other content of the counter.

4. The method as recited in claim 1, wherein:
    a variable of the at least one check function corresponding to the duration of the sequence of waiting loops, is changed as a function of the counter content by changing a number of waiting loops contained in the sequence.

5. The method as recited in claim 1, wherein:
    the duration of the sequence of waiting loops is reduced with each subsequent execution of the at least one check function, the duration being less than the time interval of the watchdog during the last execution, before the at least one check function is skipped.

6. The method as recited in claim 1, wherein:
    a number of waiting loops in the sequence of waiting loops is selected during at least one execution of the at least one check function so that the duration of the execution is below the time interval if the clock rate is slightly above the upper tolerance limit.

7. The method as recited in claim 1, wherein:
    the operating phase is at least a switching on of the microprocessor.

8. The method as recited in claim 1, wherein:
    the watchdog is supplied a clock signal that differs from a clock signal of the microprocessor.

9. A circuit arrangement, comprising:
    a counter;
    a microprocessor;
    a watchdog assigned to the microprocessor and for performing a reset of the microprocessor if a reset pulse is not received within a time interval of predetermined duration, wherein:
        a different clock signal is supplied to the watchdog than to the microprocessor;
    a non-volatile memory to which is assigned the microprocessor, at least a counter content of the counter being stored in the non-volatile memory; and
    an at least one check function of the watchdog, wherein the check function is executed in an operating phase of the microprocessor, each one of the at least one check function including a reset of the watchdog and an execution of a sequence of waiting loops, wherein the duration of the execution of the sequence of waiting loops of at least one of the at least one check function is greater than the predetermined duration of the time interval;
    wherein the counter is incremented with the execution of the at least one check function, the execution of the at least one check function being a function of a content of the counter, and
    wherein:
        the counter has a plurality of counter contents,
        an analysis is performed at one of the plurality of counter contents, and
        the least one check function is executed each time at the other counter contents.

10. The circuit arrangement as recited in claim 9, wherein:
    the non-volatile memory includes an EEPROM.

11. The circuit arrangement as recited in claim 9, wherein:
    the non-volatile memory is a part of the microprocessor.

12. A memory component storing a computer program that when executed on a microprocessor results in a performance of the following:
    causing a watchdog to monitor a reception of a reset pulse within a time interval of a predetermined duration;
    causing the watchdog to initiate a reset of the microprocessor if the reset pulse is not received; and
    executing at least one check function of the watchdog in an operating phase of the microprocessor, each one of the at least one check function including a reset of the watchdog and an execution of a sequence of waiting loops, wherein a duration of the execution of the sequence of waiting loops of at least one of the at least one check function is greater than the predetermined duration of the time interval;
    incrementing a counter with the execution of the at least one check function, the execution of the at least one check function being a function of a content of the counter;
    wherein:
        the counter has a plurality of counter contents,
        an analysis is performed at one of the plurality of counter contents, and
        the least one check function is executed each time at the other counter contents.

* * * * *